Jan. 27, 1931.   N. TRBOJEVICH   1,790,607
STEERING GEAR
Filed March 11, 1929   3 Sheets-Sheet 1
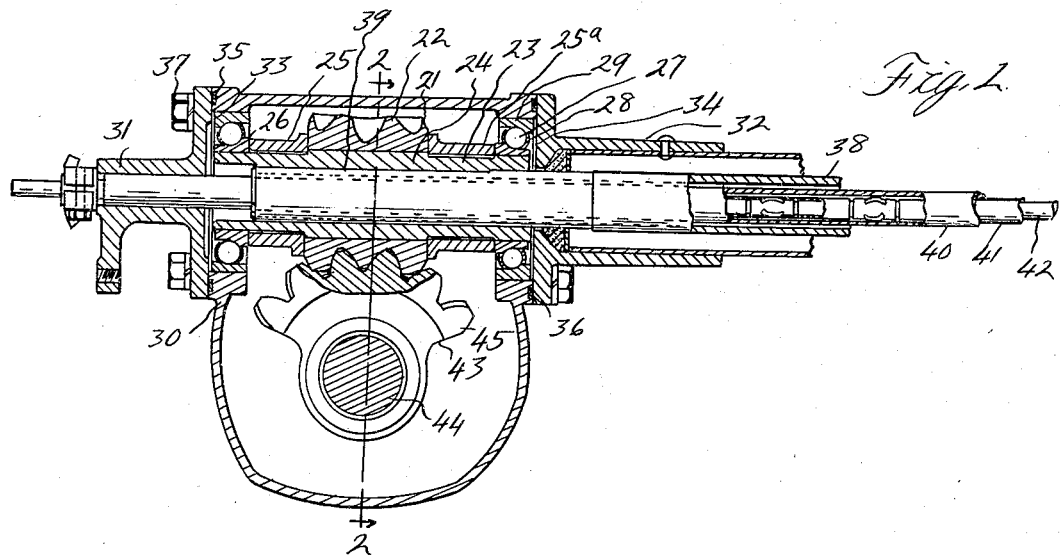
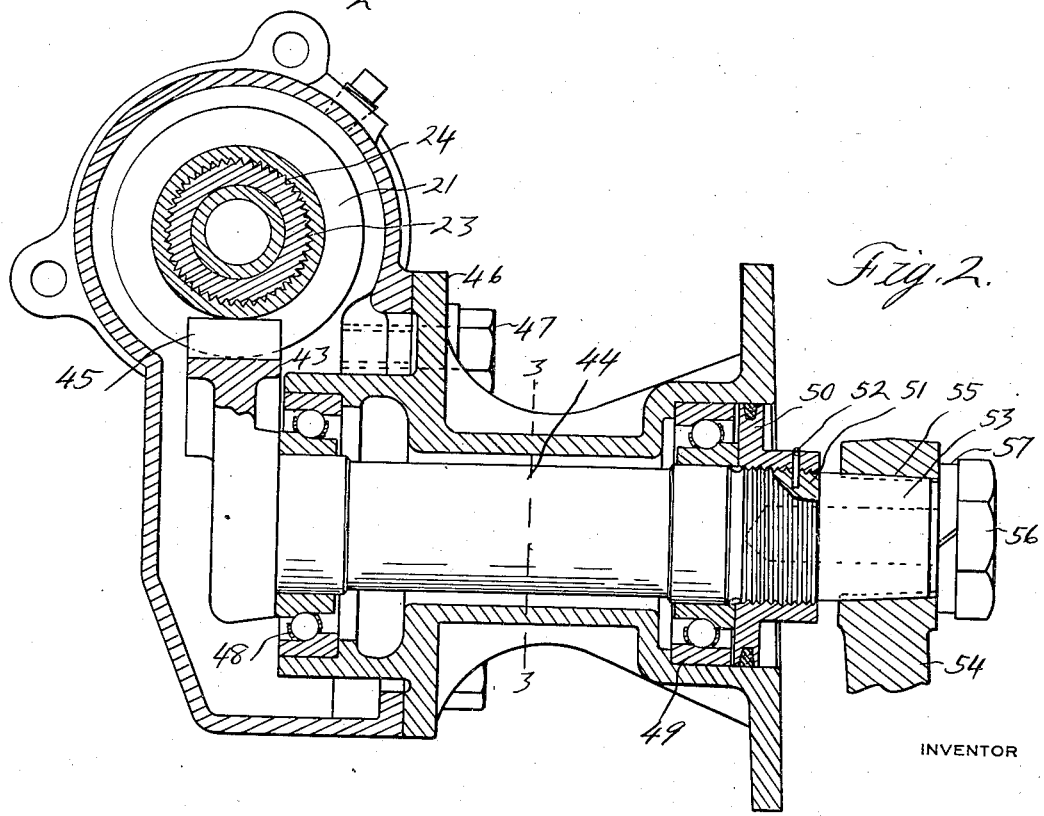
INVENTOR
Nikola Trbojevich
BY Whittemore Hulbert
Whittemore & Belknap
ATTORNEYS Jan. 27, 1931.                N. TRBOJEVICH                1,790,607
                                STEERING GEAR
                           Filed March 11, 1929    3 Sheets-Sheet 2
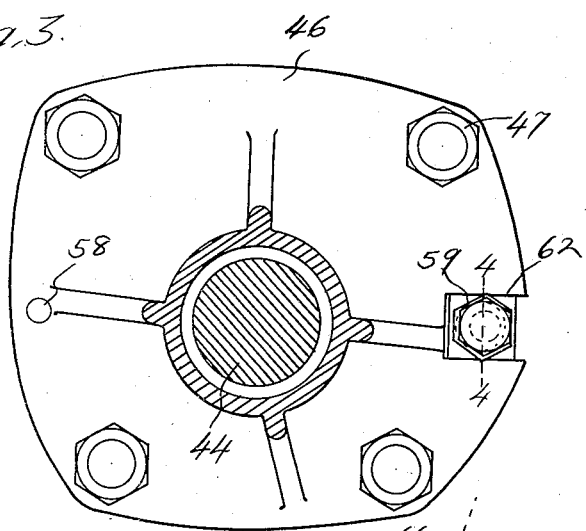
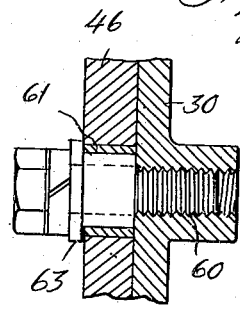
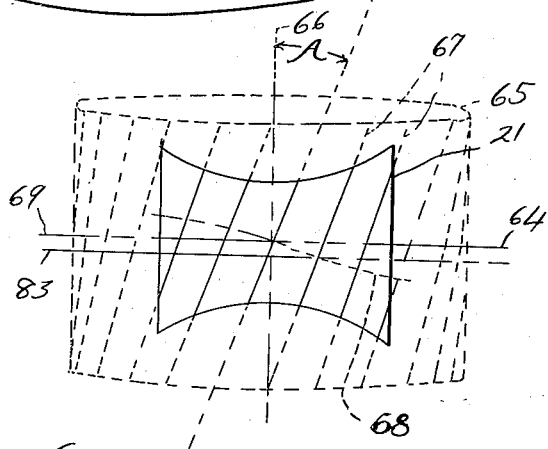
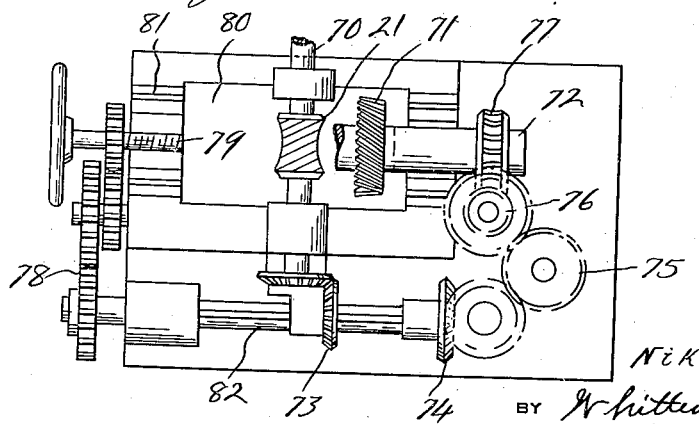
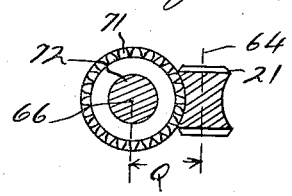
INVENTOR
Nikola Trbojevich
BY Whittemore Hulbert
   Whittemore & Belknap
                            ATTORNEYS Jan. 27, 1931.  N. TRBOJEVICH  1,790,607
STEERING GEAR
Filed March 11, 1929   3 Sheets-Sheet 3
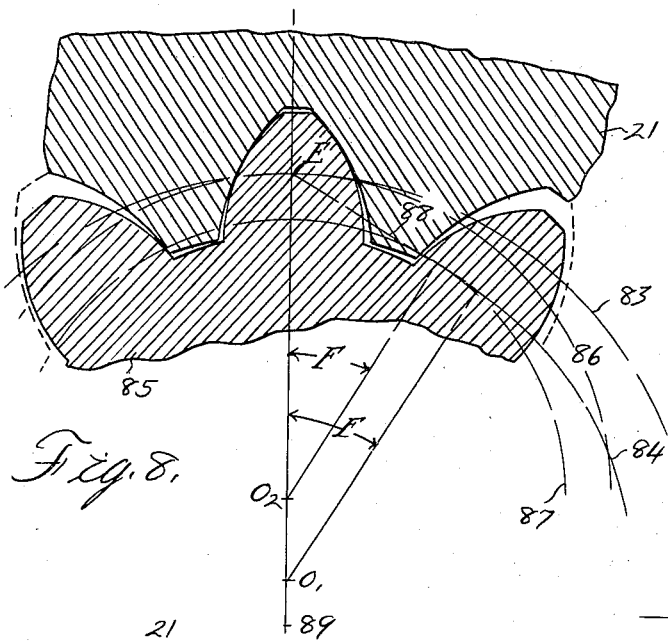
Fig. 8.
Fig. 10.
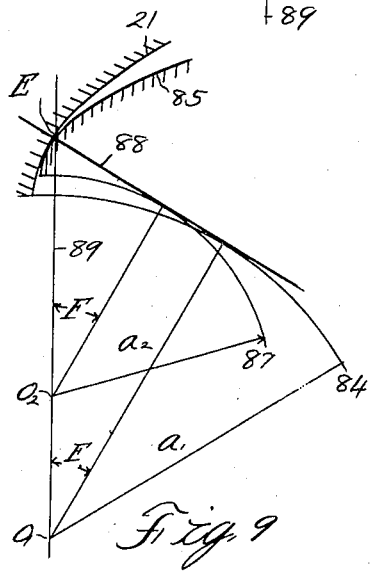
Fig. 9
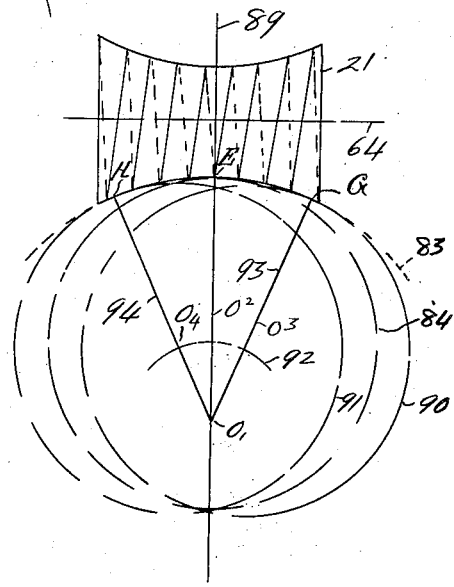
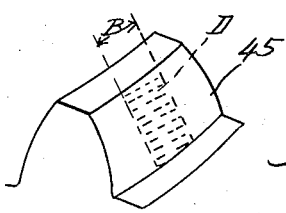
Fig. 11
INVENTOR
Nikola Trbojevich
BY Whittemore Hulbert
Whittemore & Belknap
ATTORNEYS Patented Jan. 27, 1931

1,790,607

UNITED STATES PATENT OFFICE

NIKOLA TRBOJEVICH, OF HIGHLAND PARK, MICHIGAN

STEERING GEAR

Application filed March 11, 1929. Serial No. 346,232.

The invention relates to an improvement in steering gears such as are used for steering of automotive and other vehicles.

The novelty of this invention resides in the novel formation of the driving and driven members and the methods of supporting and adjusting the same in a carrier.

The driving member is a globoid worm which is preferably cut by the process explained in my co-pending applications for patent Serial No. 277,693, filed May 14, 1928 and Serial No. 308,024, filed September 14, 1928.

One of the objects of this invention is to construct a steering gear of the worm and sector type which is capable of being manufactured and assembled with a great precision and at a reasonable cost.

Another object is to provide a gear in which the worm member engages the segment with all its threads with a line contact at all times, thus providing an ample bearing area and a long wearing life of the said members.

Another object is to avoid the lengthwise adjustment of the sector which is necessary in all present gears of the worm and sector type. Still other objects are to insure a comparatively free rotation of the worm even in the case when no backlash is provided and to construct a gear which, although ordinarily irreversible, possesses a low static coefficient of friction.

In the drawings

Figure 1 is an axial section through the worm of the steering gear;

Figure 2 is a cross section taken on the line 2—2 of Figure 1;

Figure 3 is a sectional view of the mechanism taken on the line 3—3 of Figure 2;

Figure 4 is a section taken on the line 4—4 of Figure 3;

Figure 5 is a diagram showing the principle of conjugacy between the new globoid worm and the mating helical gear;

Figure 6 shows the method of generating the worm member in a common hobbing machine;

Figure 7 is a detail view of Figure 6 taken across the axis of the cutter;

Figures 8, 9 and 10 are geometrical diagrams explaining the screw gear principle on which also such steering gears may be constructed;

Figure 11 shows the bearing area in a sector tooth in perspective.

The construction of the new steering gear will best be understood from Figures 1 and 2, Figure 1 representing the cross section of a typical assembly of this kind taken through the axis of the worm, i. e. coincident with the axis of the steering column and Figure 2 showing the cross section thereof taken through the midplane of the said worm and at right angles thereto.

The globoid worm 21 is usually made of bronze and possesses a single globoidal thread 22 of a contour derived from an involute of circle. Said worm is press-fitted upon the steel sleeve 23 and is keyed thereto by means of a plurality of sharp splines 24 as shown in cross section, Figure 2. The spacers 25 and 25a abut the worm on its each side and next to the said spacers are two similar semi-thrust ball bearings consisting of the inner races 26 press-fitted to the sleeve 23, the balls 27, ball containers 28 and the outer races 29. The said outer races are fitted into the cast steel housing 30 and held there in position by means of the left flange 31 and the right flange 32 respectively, the intervening spaces 33 and 34 respectively being shimmed to allow for the manufacturing errors. The oil seals 35 and 36 and the longitudinal tightening bolts 37 are applied in the customary manner. The tube 38 through which the steering is effected is keyed in the inside of the sleeve 23 by means of the key 39. Said hollow tube 38 also accommodates in its interior in a telescopic fashion three other tubes of successively diminishing diameters 40, 41, and 42 respectively for the operation of the auxiliary apparatus operated through the steering column in the well known and established manner.

The sector 43, Figure 2, is a steel forging having a long shank 44 integral therewith. The sector teeth 45 are true helical teeth of a constant section throughout their lengths and are inclined to the axis of rotation at a constant angle of about from 6 to 9 degrees.

The sector housing 46 is a steel casting and is bolted to the housing 30 by means of bolts 47. Said housing contains two ball bearings 48 and 49 which are capable of carrying both the radial and the thrust loads to which the sector may be subjected. The nut 50 which fits into the screw thread 51 formed in the sector shank serves as an adjusting member for both ball bearings 48 and 49 and also as an oil seal for the sector housing 46. Said nut is held in a properly adjusted position relative to the shank by means of the pin 52.

The extreme right end of the sector shank 44 is formed as a slightly tapering cone having a plurality of tapering splines 53 cut therein. The steering arm 54 possesses a corresponding number of internal tapering splines 55 fitting over the said external splines 53 and is held in a rigid position relative to the shank by means of the end screw 56 and the split washer 57. It is seen that by this means the steering arm 54 may be adjusted to any required angular position relative to the steering mechanism.

The method of adjusting the center distance of the sector 43 relative to the globoid worm 21 will now be explained. As shown in Figure 3 which is a view of the Figure 2 taken through the plane 3—3, the sector housing 46 is first pinned to the worm housing 30 by means of a dowel pin 58. Diametrically opposite to the said pin is the adjusting screw 59 which engages the threaded hole 60 of the housing 30, Figure 4, and also carries about it an eccentric bushing 61. said bushing fitting into the parallel slot 62 formed in the housing 46. The eccentric 61 is formed integral with the hexagon 63 and may be operated independent of the adjusting screw 59, thus causing the housing 46 to pivot about the dowel pin 58 and vary the center distance. After the mechanism is thus properly adjusted for the required backlash, the bolts 47 are located in the said position and the sector housing 46 is permanently secured to the worm housing 30.

The geometrical features of the globoid worm 21 and the mating sector 43 will now be explained. As shown in Figure 5, the globoid worm 21 which is rotatable about the axis 64 meshes with the helical gear 65 rotatable about the axis 66 and having a plurality of helical teeth 67, all said teeth being of a uniform cross section throughout their lengths and inclined at the same helix angle A relative to the axis 66. The line of action 68 extends above and below the midplane 69 with the result that the bearing area D in the sector tooth 45, Figure 11, will be of a certain width B, the width of the said area, other things being equal, increasing with the helical angle A, Figure 5.

The method of cutting the new globoid worm will be understood from Figures 6 and 7. The worm 21 is mounted upon the hob arbor 70 of a common gear hobbing machine where the hob is ordinarily located, and a helical Fellows cutter 71 is placed upon the work arbor 72 where the work is usually located, thus reversing the usual arrangement for gear cutting. When the arbor 70 is rotated, the rotation from the worm 21 is transmitted to the cutter 71 in timed relation through the bevel gears 73 and 74, the index change gears 75, the worm 76 and the worm gear 77. At the same time the feed mechanism is actuated also in a timed relation through the feed gears 78 and the feed screw 79, said feed screw engaging a corresponding nut in the slide 80, thus causing the same to move slowly over the ways 81 toward the cutter 71. The shaft 82 carrying the bevel gear 73 is splined in order to permit an uninterrupted rotation of the parts at all times and positions.

The axis 66 of the cutter 71 is situated above the axis 64 of the worm 21 at the exact center distance Q required for the finishing cut, as shown in detail in Figure 7.

The above described construction of the worm offers certain advantages of both theoretical as well as practical nature, which advantages have not been utilized or recognized heretofore in the construction of steering gears. As is seen from Figure 5, the worm is capable of correctly meshing with a spur gear lamina, not only in the midplane 69 but in any other offset plane such as the plane 83. From this it follows, first that the mating sector tooth 45, Figure 1 may be and is of a constant cross section throughout, and second that the sector does not have to be centered lengthwise along the axis 66. From the first named advantage it follows that the sector tooth 45 may be generated in a helical Fellows machine, or in a milling machine and also it may be readily ground after hardening in any helical gear grinding machine, whereas in the present steering gears of the worm gear type this cannot be done.

The worm 21 is so generated that the cutter 71, Figure 6 sweeps out in the worm the exact helical path conjugate to the sector. No more and no less metal is removed from the worm blank than is absolutely necessary, first to insure the passage of the sector teeth through the worm thread without interference and second to insure that the entire thread surface of the worm at some time or other touches the sector tooth. As is shown in Figure 6, the bearing area in the sector tooth 45 is of a comparatively narrow width B whereas the corresponding bearing area in the worm is incomparably greater. To cite an example, in a mechanism having a worm 2 inches in diameter and having only two full convolutions of helix, the length of the bearing or contact in the worm will be over 12 inches whereas the corresponding length in the sector will be about $1/4$ inch, that is, a ratio of one in forty-eight. Combining this with the above described feature, viz., that the sector may be easily hardened and ground, I arrived at a very favorable arrangement by making the sector of steel of great hardness and making the worm of a comparatively softer and anti-frictional material such as bronze. This arrangement offers the advantage of first reducing the initial or static friction when the oil film is broken due to the static load, and second providing the possibility of building up an oil film upon the slightest movement of the steering wheel due to the extraordinary length of contact available in the worm. On this occasion the bronze thread surface acts as an oil bumper.

As shown in Figure 1, the cross contours of the sector teeth 45 are involutes. Apart from the considerations of the ease of manufacturing the involute curves which are well known, I prefer the involutes for the reason that there is a constant torque effort in the driven axis for any constant tooth pressure at any portion of the tooth. This is due to the fact that all normals to an involute helicoid are tangent to the same base cylinder and further all of the said normals have the same inclination relative to the said driven axis thus equalizing the torque effort.

In manufacturing the new steering gear, the greatest attention should be paid to the Fellows cutter 71, Figure 6, which should be of exactly the same contour, thickness of teeth and pitch diameter as the corresponding sector. Also the lead of helix to which the hobbing machine is set by means of the change gears 75 and 78 should be the same as the lead of the sector. On the other hand, the center distance Q, Figure 7, is relatively unimportant as the worms will correctly fit into the sector even in the case when the said distance Q is greater or less than the calculated figure. The last named feature is of some practical consequence because if some of the worms are cut imperfectly in the first instance, they may be recut or burnished and thus salvaged.

The above described steering mechanism may be modified to give a point contact instead of a line contact. Such a modification is justified when it is desirable to cut the cost of manufacture down to a minimum by sacrificing some of the intimate line contact inherent in this type of gearing. It should be noted, however, that such a sacrifice does not involve the introduction of any interferences or binding in the mating gears and also that gears so made are still vastly superior in the continuity and intimacy of their contact to the well known screw gears in which both the worm and the gear are cylindrical.

The theory of this modification will be understood by considering the manner in which the new globoid worm is cut. As is seen from Figures 6 and 7, the globoid worm 21 is similar to an internal helical gear exactly enveloping the helical cutter 71 in that it will correctly mesh with any member with which the said imaginary internal gear also would mesh. However, it is a well known fact that an involute internal helical gear will mesh with any other involute external helical gear providing the latter possesses the same pitch, pressure angle and helical angle and further providing that the number of teeth is less than the number of teeth in the imaginary internal gear. In this connection, it should be noted that an external gear meshing with an internal gear sometimes produces a so-called secondary interference. This disturbance, however, does not enter into the present construction because the worm is made of a comparatively short length and a considerable pressure angle, and the difference in the radii of curvature of the worm and mating sector may be selected as small or as large as it may be desired in this class of work.

The new principle is diagrammatically illustrated in Figures 8, 9 and 10. The worm 21, Figure 8 is cut from the center $O_1$ and has a pitch circle 83 and a base circle 84. The mating sector 85 has its center at $O_2$ and its corresponding pitch and base circles are 86 and 87. The two pitch circles 83 and 86 touch each other at E in the throat plane 89 with the result that the common normal 88 is tangent to both base circles 84 and 87, thus producing the same pressure angle F in both gears.

It is seen from Figure 9 that if the pressure angle F is the same in both gears, the involutes belonging to the members 21 and 85 may be brought into a correct tangency at the point E, the necessary and sufficient condition being that their respective base radii $a_1$ and $a_2$ should be proportional to the corresponding pitch radii, i. e.

$$\frac{a_1}{a_2} = \frac{O_1 E}{O_2 E} \quad (1)$$

The advantage of the said construction will be evident from Figure 10. The worm 21 is cut from the center $O_1$ and has the pitch circle 83. With it the smaller external gear having a pitch radius 84 and a center at $O_2$ will mesh and the point of contact will be at E as already explained. However, there is nothing to prevent the shifting of the point of mutual contact to the points G or H at will in which case the pitch circle 84 will shift into the new respective positions 90 and 91 shown with dotted lines, and the center of rotation $O_2$ also will be translated along the circular arc 92 to its new positions $O_3$ and $O_4$ respectively. It is perfectly permissible to do so because the worm was generated in such a manner as to correspond to an internal helical gear not only in the gorge plane 89 but in any other radial plane such as the planes 93 and 94, for instance.

Thus, in this case the latitude through which the worm 21 may be longitudinally shifted along the axis 64 and still correctly mesh is equal to the distance $O_3 O_4$, said distance being readily calculable by knowing the length of the worm and the distance $O_1 O_2$. This is of a considerable help in manufacturing as the worm may be correctly centered in the carrier by calculation alone, i. e. without the use of delicate adjustments and shims.

What I claim as my invention is:

1. In a steering gear mechanism, the combination of a shaft adapted to be connected to the steering element, a shaft extending transversely thereto adapted to be connected to the controlling element, a gear on the first shaft having twisted helical teeth of constant cross section throughout their length and a mating globoid worm on the second shaft.

2. In a steering gear, the combination of a globoid worm and an involute helical gear tooth meshing therewith, the worm thread being of such a form as might be generated by rotating an involute spur gear lamina about its axis, by rotating the worm in unison therewith and by traversing the said lamina about its axis in a helical path crosswise to the axis of the worm and the helical gear tooth is so formed that it has the same pitch, pressure angle and helix angle as the said lamina, a pitch radius not greater than the said lamina and an axis disposed parallel to the axis of the said lamina.

3. In a steering mechanism, a steering member, a manually operable controlling member, gearing connecting the said members comprising a globoid worm connected to the said controlling member, said worm having convex and concave spiral threads, viz—concave in the axial plane of the worm and convex at right angles thereto and a gear member connected to the said steering member, said gear member having a plurality of helically twisted teeth of the same cross section throughout their lengths and equidistant from the helix axis, said teeth having contacting surfaces which are convex at every point.

4. In a steering mechanism, a manually operable controlling shaft comprising a globoid worm, said worm having spiral threads of a concave tooth contour in the axial plane, and a steering shaft transversely disposed relative to the first shaft comprising a gear member having a plurality of helically twisted teeth of the same cross section throughout their lengths and equidistant from the helix axis, said teeth having curved convex tooth contours of varying radii of curvature in which the said radii increase in their lengths as progressing from the roots toward the tops of the said teeth.

5. In a steering mechanism, a manually operable controlling shaft comprising a globoid worm having spiral threads of a concave contour substantially conforming to a series of involutes in its axial plane and a mating gear member connected to a transverse steering shaft, said gear having a plurality of twisted teeth drawn about an axis along a series of circular helixes and having convex tooth surfaces composed of a series of involutes all drawn from the same base cylinder, the relation being such that the quotient formed by dividing the base radius by the number of teeth in the gear member is exactly equal to the quotient formed by dividing the base radius of the involutes of the worm by the number of teeth in the completed circle from which the globoid worm is generated.

6. In a steering mechanism, a steering shaft comprising a cylindrical gear member having a plurality of convex and longitudinally twisted teeth disposed about its circumference and a transverse controlling shaft comprising a globoid worm having a plurality of spiral threads so formed that the hollow face of the worm envelops the pitch circle of the gear member and its each individual thread also possesses a hollow tooth contour to envelop the corresponding convex tooth faces of the gear teeth thus providing a worm having an increased ability to withstand road wheel shocks.

7. In a steering mechanism, a steering shaft comprising a helical gear having a plurality of twister teeth of the same cross section throughout their lengths, said teeth having convex cross contours of an ever-increasing radius of curvature and pressure angle as measured from the roots toward the tops of the said teeth and a mating globoid worm connected to a transverse controlling shaft, said worm being so formed that it envelops the gear member along the pitch circle with its hollow face and also envelops the individual gear teeth with its hollow thread cross contours for the purpose of providing a combination of a worm having the maximum tooth strength, with a gear member having a substantially constant torque arm length at any phase of engagement and in which the meshing conditions do not change by the accidental axial shifting of the gear member.

8. In a steering mechanism, a steering shaft comprising a gear member having a plurality of teeth equidistant from an axis and of the same cross section throughout their lengths and a transverse controlling shaft comprising a globoid worm having a concave meridian curve and concave tooth flanks in its axial plane, the arrangement being such that the pressure angle continuously increases from the bottoms to the tops of the teeth in the gear member and the said gear member may be axially shifted without affecting the meshing conditions of the gear teeth.

9. In a steering mechanism, a manually operable globoid worm and a mating sector transversely disposed in which the worm teeth are made concave on their both sides as measured in the axial plane thereby increasing their shock resisting ability.

10. In a steering mechanism, a globoid worm having a plurality of convolutions of a spiral thread wound about its circumference in which the cross contours of the threads in the axial plane are concave and in their curvature substantially conform to a series of involutes drawn from a base circle.

11. In a steering mechanism, a globoid worm having a plurality of convolutions of a spiral thread wound about its circumference in which the cross contours of the threads in the axial plane are concave and of a variable curvature, said variation being such that the tooth curve intersects the radius of the worm at a greater angle near the roots of the thread and at a less angle at the tops of the said thread thereby equalizing the surface stresses over the entire thread surface and of making the worm more resistant with regard to wheel impacts.

12. In a steering mechanism, the combination of a manually operable globoid worm having a plurality of convolutions, of a spiral thread wound about its circumference with a mating sector having a plurality of equispaced twisted helical teeth and an axis transversely disposed relative to the worm, in which the radius of curvature of the meridian circle of the worm is greater than the pitch radius of the sector and in which the cross contours of the worm thread are of different radii of curvature than the corresponding radii of the contours of the sector teeth, said difference being predetermined to enable the worm to correctly mesh with the sector in a plurality of successive axial displacements of the worm.

13. In a steering gear, the combination of a globoid worm with a helical sector in which the globoid has a greater meridian radius than the pitch radius of the sector, in which the tooth curves of the worm in the axial plane are different from and conjugate to the cross contours of the sector teeth, in which the sector teeth are of a uniform cross section throughout their lengths and have their helical tooth axes all equidistant from a common axis and in which both the sector and the worm may be displaced along their respective axes without losing the required tangency of the mating surfaces when under load.

14. In a steering gear, the combination of a globoid worm with a mating sector in which the meridian and the thread profiles of the globoid are all concave and the sector pitch surface and tooth contour are all convex and in which all convex radii in the sector are shortened in a predetermined ratio relative to the corresponding radii of the concave worm in order to provide an enveloping action through a range of axial shiftings of the worm.

15. In a steering gear, the combination of a globoid worm with a mating sector, in which the meridian curve of the worm is a circle and the thread profiles of the worm are of substantially involute curvature, in which the sector teeth are helically twisted and possess substantially involute cross contours, in which the pitch radius of sector is shortened relative to the meridian radius of the worm at a predetermined ratio and the base radius of the sector is also shortened relative to the base circle of the involutes of the worm in the same ratio thereby enabling the worm to be shifted along its axis within predetermined limits and also enabling the worm and sector to operate at varying center distances without losing the required tangency of the mating surfaces.

16. In a steering gear, the combination of a globoid worm with a mating sector, in which the globoid possesses a concave meridian curve and a plurality of thread cross contours of substantially involute shape, in which the sector teeth are of a uniform cross section throughout their lengths, have their tooth axes all equidistantly disposed from a common axis and have substantially involute cross contours, in which the pitch and the base radius of the sector are shortened in a predetermined ratio relative to the meridian and the base radius of the worm and in which both the sector and the worm may be displaced along their respective axes, and the two members may be moved toward or away from each other without losing the required tangency of the mating tooth surfaces.

17. In a steering gear, a globoid worm and a cylindrical mating sector having helically twisted teeth of the same cross section throughout their lengths in which the thread contours of the worm are concave, conforming to an ever-increasing radius of curvature from the tips toward the roots thereof and the sector teeth are convex and of a variable cross curvature, the radii of the latter being point for point of a shorter length than the first named radii, in which the pitch radius of the sector is also shorter than the meridian radius of the worm, thus permitting both the worm and the sector to be displaced through a range along three mutually perpendicular axes without losing the tangential enveloping contact therein.

18. In a steering gear, a globoid worm of an hour-glass shape having thread contours in the axial plane curved according to a variable radius of curvature and a sector having a plurality of equispaced teeth of a cross contour conjugate to the said thread contours, in which the sector is rotatable about its axis transverse to and eccentric relative to axis of the meridian curve of the worm, in which the conjugacy of the thread and sector tooth contours is determined with regard to the eccentricity of the sector axis relative to the meridian axis and in which the worm may be shifted along its axis and the sector may be shifted transversely to its axis through a limited range without destroying the required tangency of envelopment of the two sets of mating surfaces.

19. In a steering gear, the combination of a globoid worm of a concave meridian contour with a transversely disposed mating sector having a cylindrical pitch surface in which the axis of the sector is eccentric relative to the axis of the worm meridian and the cross contours of the worm threads are of a curvature different from and conjugate to the cross contours of the worm teeth, said conjugacy being predetermined from the eccentricity of the sector axis relative to the axis of the worm meridian, thus enabling the worm to be shifted axially through a predetermined limited distance without losing its enveloping contact relative to the sector.

20. In a steering gear, the combination of a hollow globoid worm with a circular sector transverse thereto in which the globoid is generated from a meridian circle having a greater number of teeth than the number of teeth in the completed pitch circle of the sector and in which the cross contours of the worm threads are modified with respect to the cross contours of the sector teeth in such a manner that both are mutually conjugate and capable of being rolled off from the same basic rack by means of two different rolling circles.

21. The combination of an hour-glass-shaped globoid worm with a cylindrical sector mating therewith in a relatively transverse position and capable of a limited swing in which the pitch of the worm threads and the pitch of the sector teeth is the same for both members in the axial plane of the worm, in which the axis of the sector is eccentric relative to the meridian axis from which the worm is generated, in which the cross contours of the worm threads are of a variable curvature determined in such a manner that at any point of contact with the sector teeth the normals drawn to the cross contours of the worm are at a fixed distance from the meridian axis of the worm and also at another fixed distance from the sector axis, thus obtaining a globoid worm which may be rocked in the plane of the sector without losing the tangency and in which the tooth load required to deliver a predetermined torque is substantially constant at all phases of engagement.

22. A combination of a helical gear sector capable of a limited swing with a mating globoid worm in which the cross contours of the sector teeth and of the worm threads are involutes drawn from two different base circles, in which the sector axis is eccentric relative to the meridian axis of the globoid and in which the lead of helix and the pitch radius of the sector teeth are in a direct ratio with the corresponding lead of helix and pitch radius of the worm as drawn from its meridian axis, said ratio being equal to the ratio of the corresponding base radii of the sector and worm.

23. A combination of a gear sector capable of a limited swing with a mating globoid worm in which the axis of the sector is eccentric relative to the axis of the meridian circle of the worm and in which the cross contours of the sector teeth and of the worm threads as measured in the axial plane of the worm are of different curvatures, the relation being such that both sets of cross contours are generated from the same basic rack when rolled thereupon by means of two different pitch circles, one circle for the worm and another for the sector.

In testimony whereof I affix my signature.

NIKOLA TRBOJEVICH.